No. 729,649. PATENTED JUNE 2, 1903.
H. NYBERG.
SHAFT CONNECTION.
APPLICATION FILED JUNE 19, 1902.
NO MODEL.
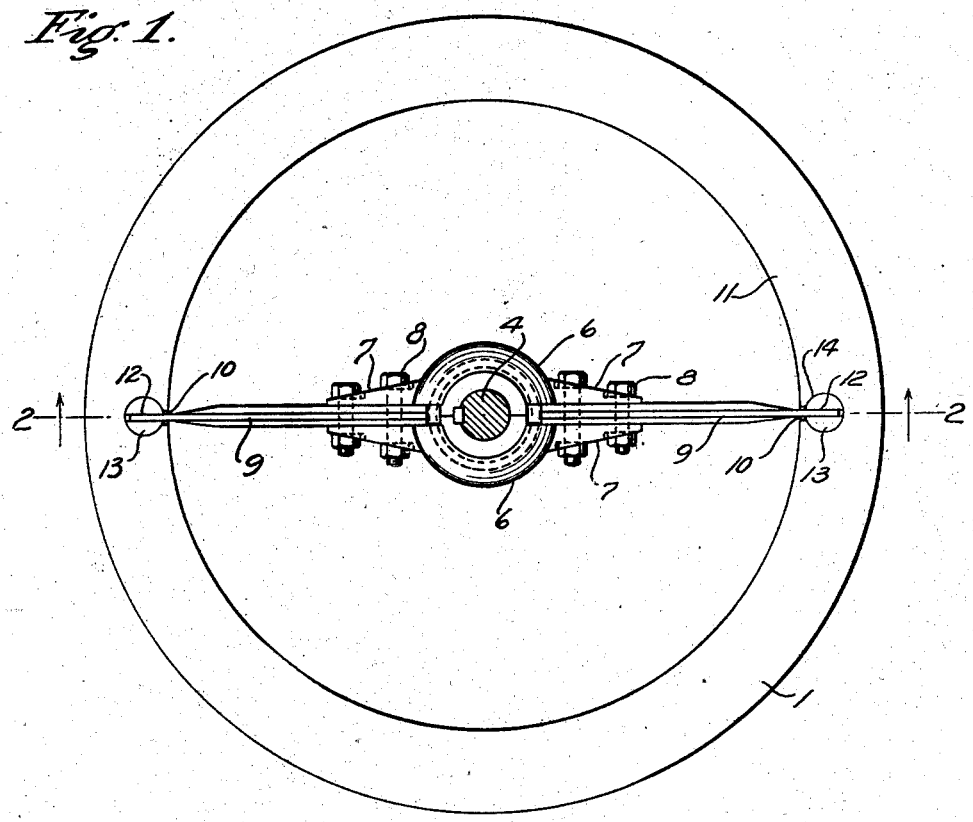
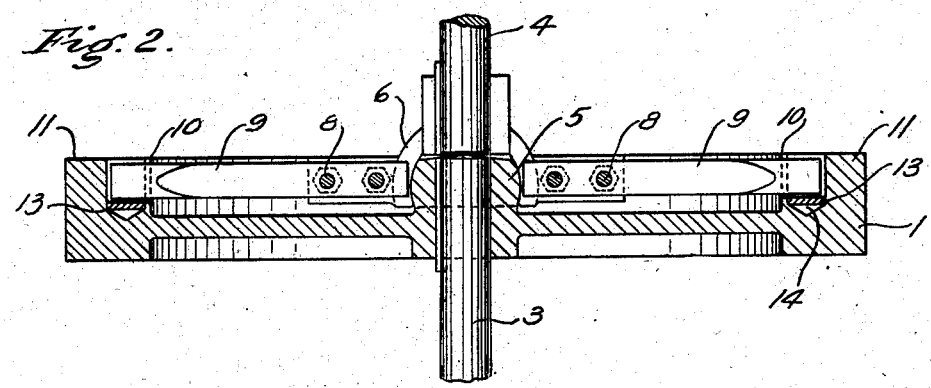
Witnesses.
Otto E. Johnson.
Blanche Michael.
Inventor,
Henry Nyberg,
By Rummler & Rummler
Attorneys.

No. 729,649. Patented June 2, 1903.

UNITED STATES PATENT OFFICE.

HENRY NYBERG, OF KENOSHA, WISCONSIN.

SHAFT CONNECTION.

SPECIFICATION forming part of Letters Patent No. 729,649, dated June 2, 1903.

Application filed June 19, 1902. Serial No. 112,310. (No model.)

*To all whom it may concern:*

Be it known that I, HENRY NYBERG, a citizen of the United States of America, and a resident of Kenosha, in the county of Kenosha, Wisconsin, have invented certain new and useful Improvements in Shaft Connections, of which the following is a specification.

The main object of my invention is to provide an improved form of yielding shaft connection which is particularly applicable for the shaft carrying the fly-wheel in automobiles and which is suitable for other mechanisms in which the framework is lightly constructed and subject to racking strains and where the shafting is liable to receive sudden bending strains or to be suddenly started and stopped. I accomplish this object by the device shown in the accompanying drawings, in which—

Figure 1 is an elevation of a fly-wheel and shaft constructed and connected according to my invention. Fig. 2 is a section along the line 2 2 of Fig. 1.

In the construction shown the fly-wheel 1 is keyed to a shaft 3, which is journaled in bearings (not shown in the drawings) in alinement with the driving-shaft 4. The part 5 of the hub of the fly-wheel 1 is made in the form of a ball and fits a split socket-piece 6, which is keyed to the shaft 4. The two parts of the socket-piece 6 are each provided with laterally-projecting flanges 7 and secured together by means of the bolts 8. A pair of laminated spring-arms 9 are securely clamped between the flanges 7 of the socket-piece 6 and extend radially outward through the slots 10 in the rim 11 of the fly-wheel 1. In order to permit the free bending of the springs 9, the outer extremities of said springs are seated in the close-fitting slots 12 in the pins 13. The pins 13 are cylindrical and exactly fit the recesses 14, which communicate with the slots 10. The pins 13 have a slight turning movement in the recesses 14. The slots 10 are made wide enough to permit the springs to have a slight movement therein when bending, so as to turn the pins 13. The pins 13 are held in the recesses 14 by the springs 9.

The web of the fly-wheel 1 connects the rim 11 with the hub, so as to practically form a part which extends outwardly from the member 5 and over the member 6, said member 6 being connected to said part through the resilient arms 9.

The operation of the device shown is as follows: When the motor on the shaft 4 is suddenly started or stopped, the springs 9 will yield slightly, and the change of motion will be gradually transmitted to the fly-wheel, thus avoiding excessive torsional strains upon the shaft. If the supporting-frame becomes racked through a sudden jar, as in case the device shown is applied to an automobile when same is moving over a rough road, the shafts 3 and 4 will be thrown out of alinement, but will not be strained, since the ball 5 and the socket-piece 6 may move relatively to each other through the torsional yielding of the springs 9. It will thus be seen that the construction shown avoids the possibility of either torsional or bending strains upon the shaft. The form of connection between the springs 9 and the rim 1 of the fly-wheel avoids an abrupt bending of the spring at the inner edge of the rim, and thus decreases the liability of the spring becoming ruptured and breaking at this part.

It will be seen that numerous details of the construction shown may be altered without departing from the spirit of my invention. I therefore do not confine myself to such details, except as hereinafter limited in the claims.

What I claim as my invention, and desire to secure by Letters Patent, is—

1. The combination of a shaft; a second shaft in alinement with said first shaft; a ball-and-socket joint connecting said shafts; a wheel secured to said first shaft; and a laminated flat spring having one end rigidly secured to said second shaft and having its other end yieldingly secured to said wheel at a considerable distance outward from said shafts, substantially as described.

2. The combination of a shaft; a second shaft in alinement with said first shaft; a ball-and-socket joint connecting said shafts; a wheel secured to said first shaft; and a laminated flat spring having one end rigidly secured to said second shaft and having its other end seated in a radially-disposed slot in said wheel, substantially as described.

3. The combination of a shaft; a second shaft in alinement with said first shaft; a balland-socket joint comprising a pair of members connecting said shafts; one of the members of said joint having a part extending a considerable distance radially outward and over the second member; a radially-disposed arm of resilient material having its inner end rigidly secured to said second member; and suitable yielding means securing the outer end of said arm to the outwardly-extending part of said first member, said means being adapted to confine the outer end of said arm against rotation relatively of said first member while permitting said outer end to yield radially of said shafts, substantially as described.

4. The combination of a shaft; a second shaft in alinement with said first shaft; a ball-and-socket joint connecting said shafts; a wheel secured to said first shaft; a radially-disposed arm of resilient material having its inner end rigidly secured to said second shaft; and suitable yielding means securing the outer end of said arm to said wheel, said means being adapted to confine the outer end of said arm against rotation relatively of said first member while permitting said outer end to yield radially of said wheel, substantially as described.

5. The combination of a shaft; a second shaft in alinement with said first shaft; a ball-and-socket joint connecting said shafts; a wheel secured to said first shaft; and a radially-disposed arm of resilient material having one end rigidly secured to said second shaft and having its other end seated in a radially-disposed slot in said wheel.

6. The combination of a shaft; a second shaft in alinement with said first shaft; a ball-and-socket joint connecting said shafts; a wheel secured to said first shaft; and a radially-disposed arm of resilient material having one end rigidly secured to said second shaft and having its other end pivotally connected with said wheel and radially slidable thereon.

7. The combination of a shaft; a second shaft in alinement with said first shaft; a wheel secured to said first shaft and having a ball-shaped hub; a split socket keyed to the adjacent end of said second shaft and fitting said hub; a radially-disposed arm of resilient material having one end rigidly secured to said socket and having its other end seated in a radially-disposed slot in the rim of said wheel, substantially as described.

8. The combination of a shaft; a wheel journaled concentrically with the axis of said shaft, and having relative rotary movement; a member pivotally connected to said wheel, toward its periphery, on an axis substantially parallel with the axis of the wheel, and having a transverse slot; and a resilient arm having one end secured to said shaft, and the other end seated in said slot and longitudinally movable therein.

9. The combination of a shaft; a wheel journaled concentrically with the axis of said shaft, having relative rotary movement, and having a circular aperture in the side of its rim with an axis substantially parallel with the axis of said wheel, and a slot extending from said aperture through the inner face of the rim; a pin seated in said aperture and having a slot extending from the slot in the rim; and a resilient arm having one end secured to said shaft, and the other end seated in said slot and longitudinally movable therein; the slot in the rim being of suitable size to permit a slight oscillation of the arm and pin on the axis of said circular aperture.

10. The combination of a shaft; a second shaft in alinement with said first shaft; a ball-and-socket joint connecting said shafts; a wheel rigidly mounted on said first shaft and having a circular aperture in the side of its rim with an axis substantially parallel with the axis of said wheel, and a slot extending from said aperture through the inner face of the rim; a pin seated in said aperture and having a slot extending from the slot in the rim; and a resilient arm having one end secured to said second shaft and the other end seated in said slots and longitudinally movable therein; the slot in the rim being of sufficient size to permit a slight oscillation of the arm and pin on the axis of said circular aperture.

11. The combination of a shaft; a second shaft in alinement with said first shaft; a ball-and-socket joint connecting said shafts; a wheel rigidly mounted on said first shaft and having a radial slot extending toward its periphery; and a resilient arm having one end secured to said second shaft and the other end seated in said slot and longitudinally movable therein.

12. The combination of a shaft; a second shaft in alinement with said first shaft; a ball-and-socket joint connecting said shafts; a wheel rigidly mounted on said first shaft; a member pivotally connected to said wheel, toward its periphery, on an axis substantially parallel with the axis of the wheel, and having a transverse slot; and a resilient arm having one end secured to said shaft, and the other end seated in said slot and longitudinally movable therein.

Signed at Kenosha, this 14th day of June, 1092.

HENRY NYBERG.

Witnesses:
   JOHN C. SLATER,
   E. M. STOKES.